United States Patent [19]

Nordeborn et al.

[11] Patent Number: 4,870,296
[45] Date of Patent: Sep. 26, 1989

[54] CONTROL DEVICE FOR A MAIN-LIGHT CIRCUIT OF A MOTOR VEHICLE

[75] Inventors: Krister Nordeborn, Gråbo; Knut-Olof Åkesson, Trollhättan, both of Sweden

[73] Assignee: Saab-Scania Aktiebolag, Sweden

[21] Appl. No.: 214,393

[22] Filed: Jul. 1, 1988

[30] Foreign Application Priority Data

Jul. 3, 1987 [SE] Sweden .................................. 8702743

[51] Int. Cl.⁴ ............................................... B60Q 1/02
[52] U.S. Cl. ...................................... 307/10.8; 315/82
[58] Field of Search .......................... 307/10 LS, 10.8; 315/82, 77, 80, 307, 83

[56] References Cited

U.S. PATENT DOCUMENTS 3,832,597  8/1974  Mitchell ...................... 307/10 LS X
4,684,819  8/1987  Haag et al. .................. 307/10 LS X
4,686,423  8/1987  Eydt ......................... 315/82

FOREIGN PATENT DOCUMENTS 1222393  8/1966  Fed. Rep. of Germany .
1480207  8/1969  Fed. Rep. of Germany .
1480212  1/1970  Fed. Rep. of Germany .
2121079  11/1972  Fed. Rep. of Germany .

Primary Examiner—William M. Shoop, Jr.
Assistant Examiner—Sharon D. Logan
Attorney, Agent, or Firm—Ostrolenk, Faber, Gerb & Soffen

[57] ABSTRACT

In a control device for a main-light circuit of a motor vehicle, relays are controlled by an electronic control unit which can be activated by a vehicle-light selector switch and a dimmer switch for switching between dipped beam and full beam. The control unit is constructed so that the headlights will always be switched to dipped beam when the vehicle main lights are switched on, and also so that the main lights can be switched on, even in the event of a malfunction.

13 Claims, 3 Drawing Sheets

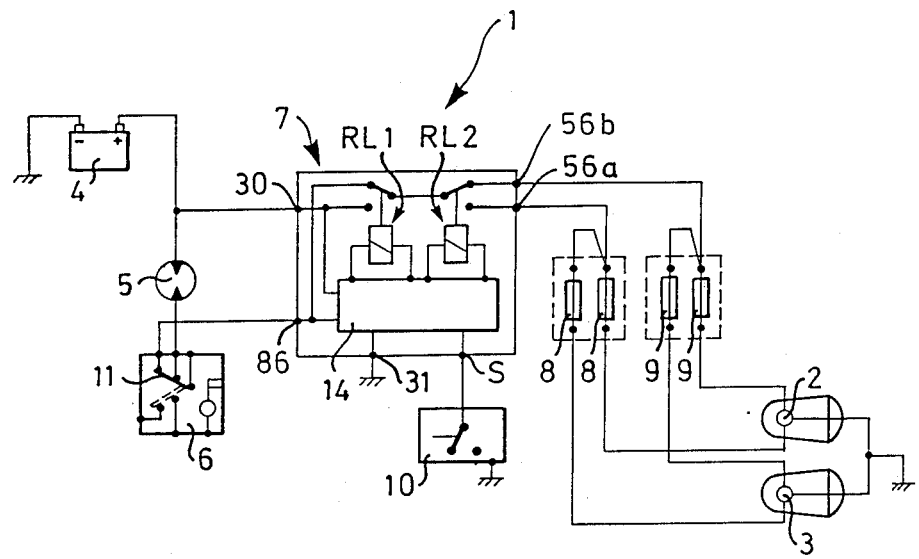
FIG.1
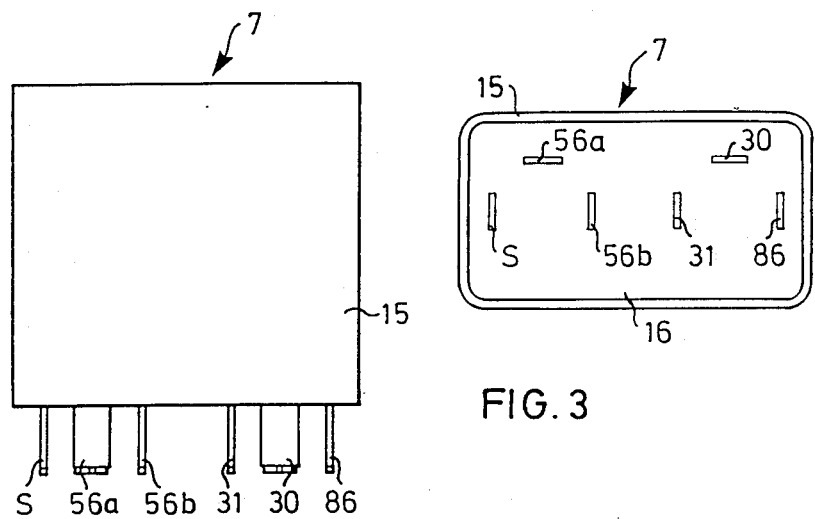
FIG.2
FIG.3

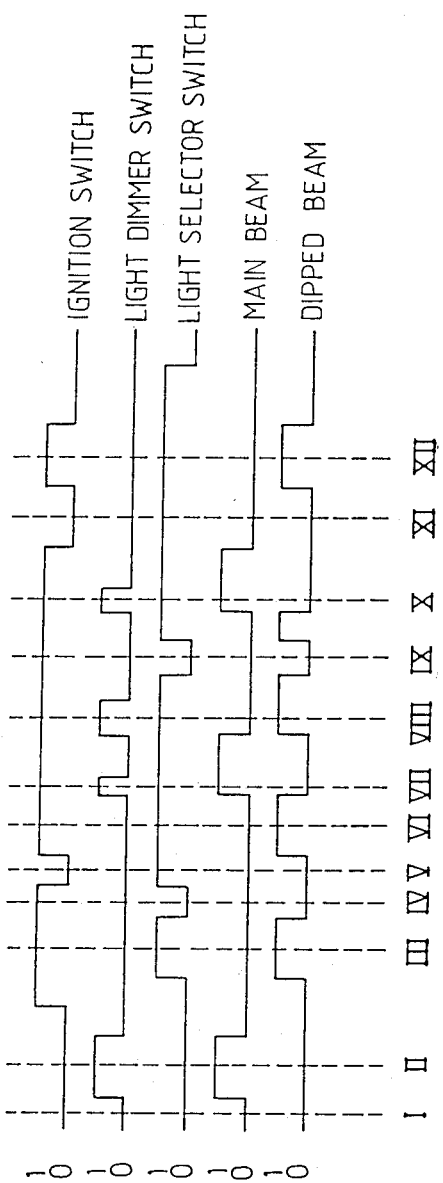

CONTROL DEVICE FOR A MAIN-LIGHT CIRCUIT OF A MOTOR VEHICLE

BACKGROUND AND SUMMARY OF THE INVENTION

The present invention relates to a control device for a main-light circuit of a motor vehicle the circuit is provided with (a) inputs which are connectible to one terminal of a voltage source and of which inputs one is intended to be connected via a vehicle light selector switch for selecting a desired vehicle lighting facility; (b) outputs which are intended for connection to the main lights of the vehicle and of which outputs at least one is intended for connection to the dipped-beam system and at least one is intended for connection to the main-beam system; (c) outputs which are connectible to the outer terminal of the voltage source via the vehicle chassis and of which outputs one is intended to be connected via a light dimmer switch intended for switching between dipped beam and main beam; adn also with (d) beam changing relays connected to such inputs and outputs, relays being connected to an electronic control unit which activates the relays as a function of whether the input which is connectible to the lights switch and the output which is connectible to the dimmer switch are connected to the voltage source or not.

Present day control devices of the above-described kind are comprised entirely of relays and are not sufficiently reliable. The relays included are often relatively complicated and therefore difficult to manufacture. Good functional reliability, however, requires high manufacturing precision. Another drawback with present day control devices is that a relay malfunction will jeopardize the possibility of switching on the vehicle main lights. Another drawback with present day control devices is that when switching on the vehicle main lights the main beam is often switched on without always being noticed by the driver. This is an unfortunate occurrence from the aspect of traffic safety.

An object of this invention is to provide an improved control device which does not have the foregoing drawbacks and which is simpler to manufacture and is more reliable in operation.

This object is achieved in accordance with the invention in that the so-called rest contact of a first monostable relay is connected to the control device input intended for connection to the light selector switch, and in that the input of such relay is connected to the input of a second monostable relay whose rest contact is connected to the dipped beam output. Accordingly when no relays can be activated there is provided a current path for supplying current to the dipped beam facility. In this way there is obtained for the supply of power to the dipped beam an emergency current path which can be supplied through the light selector switch. This embodiment enables dipped lights to be used even when the control device malfunctions, which is highly advantageous from the aspect of traffic safety.

BRIEF DESCRIPTION OF THE DRAWINGS

The invention will now be described in more detail with reference to an exemplifying embodiment thereof illustrated in the accompanying drawings, in which

FIG. 2 is a side view of an inventive control device;

FIG. 3 is an end view of the control device illustrated in FIG. 2;

FIG. 5 is a functional diagram for the main light circuit in FIG. 1.

DESCRIPTION OF THE PREFERED EMBODIMENT

Figure 1:
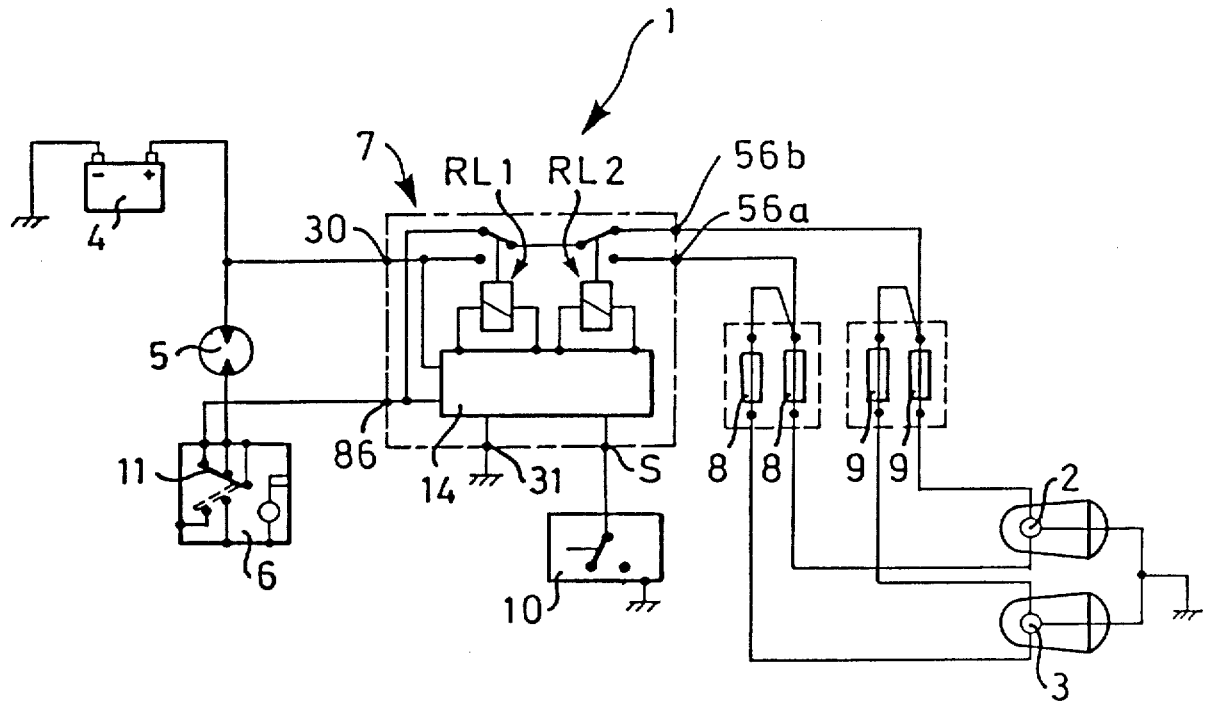
FIG. 1 illustrates schematically a vehicle main-light circuit which incorporates a control device according to the invention.

FIG. 1 illustrates those components of a vehicle main light circuit 1 which are essential in obtaining an understanding of the invention, and shows two headlamps 2 and 3, e.g. H4-lamps, both of which hcan be switched between a dipped-beam mode and a main-beam mode and which are supplied from the positive terminal of a voltage source 4. A manually operable switch in the form of a conventional ignition switch 5 is connected between the voltage source 4 and a vehicle light selector switch 6, for selecting the vehicle lighting desired. The light switch 6 is connected to a first input 86 of a control device 7 (shown in dashed lines) which is constructed in accordance with the invention and which is connected to the main-beam connections on the two headlamps 2 and 3, via a first output 56a and two fuses 8. The control device is also connected to the dipped-beam connections on the two headlamps 2 and 3 via a second output 56b and two fuses 9. A third output 31 on the control device 7 is connected to the negative terminal of the voltage source 4, through the vehicle chassis. A conventional light dimmer switch 10, normally placed on the steering wheel, is connected between the vehicle chassis and a fourth output S, for influencing the working mode of the headlamps 2 and 3. A second input 30 on the control device 7 is connected directly to the positive terminal of the voltage source 4.

The light switch 6 is of a conventional kind, with which the vehicle main lights, i.e. the headlamps 2 and 3, are switched on when the contact 11 of the switch occupies the position shown in full lines. The main lights are switched off when the switch contact 11 occupies its central position, shown in broken lines. The light switch 6 is normally situated on the vehicle instrument panel. The light dimmer switch 10 is of the spring-back kind and when in its normal inactivated position holds open the connection between the fourth output S of the control device 7 and the chassis, but is operable to close the connection temporarily when activated.

The control device 7, which will be described in more detail hereinafter, includes a first shift relay RL1 and a second shift relay RL2, both of which are controlled by an electronic control unit 14. The first relay RL1 can shift between the inputs 86 and 30 and is connected to the second relay RL2, which in turn can shift between the dipped-beam output 56b and the main or full beam output 56a. The rest contact of the relay RL1 is connected to the input 86 of the control device 7, whereas the rest contact of the relay RL2 is connected to the dipped-beam output 56b on the control device 7.

The control device 7 preferably has the form of a readily exchanged unit, in which the vital parts of the device are protected by a cover or hood 15 and a base plate 16 which is sealingly connected hereto. The connections S, 56a, 56b, 31, 30 and 86 have the form of flat pins which protrude through the base plate 16. The cover 15 is preferably configured to enable the device to be secured with the aid of an angle bracket or attachment clip if necessary. The cover 15, and also the control device in general, must be capable of withstanding the environment of a vehicle engine bay.

Figure 4:
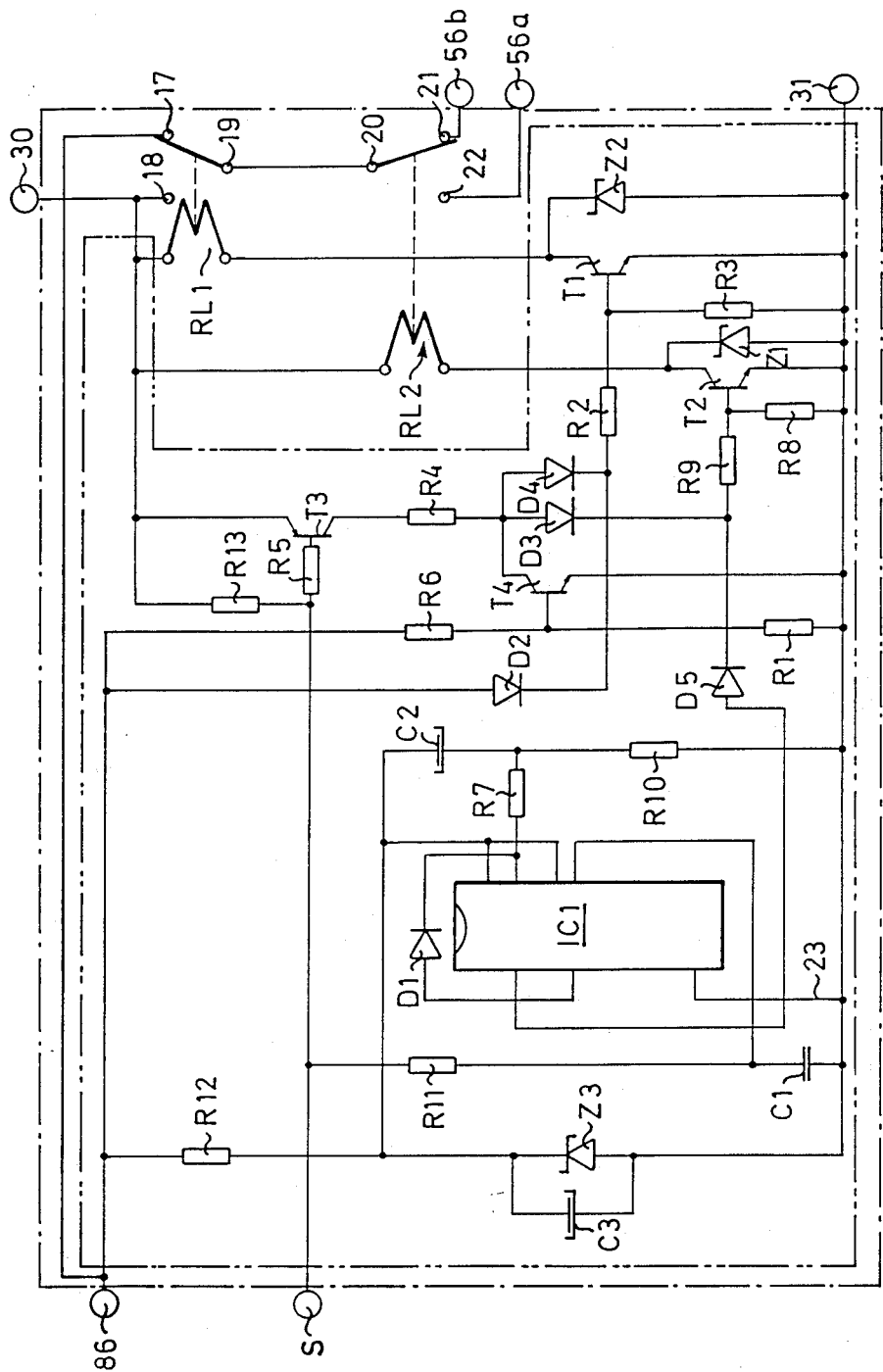
FIG. 4 illustrates an example of an electrical circuit for the inventive control device.

A closer understanding of the construction of the control device 7 will be had from the exemplifying embodiment of a control-device circuit illustrated in FIG. 4. The rest contact 17 and working contact 18 of the first relay RL1 are connected to the inputs 86 and 30 respectively. The input 19 is connected with the input 20 on the second relay RL2, the rest contact 21 and working contact 22 of which are connected to the dipped-beam output 56b and the full-beam output 56a respectively. The operating coils of both relays are connected at one end to the input 30 and to the output S via a resistor R13, and also to the emitter of a PNP-type transistor T3. The base of this transistor is connected to the output S through a resistor R5, whereas the collector is connected through a resistor R4 to the collector of an NPN-type transistor T4 and also to the anode of two diodes D3 and D4. The base of the transistor T4 is connected through a resistor R6 to the input 86, and to the output 31 through a resistor R1, whereas the emitter is connected to the output 31. The input 86 is connected to an NPN-type transistor T1 through a diode D2 and a resistor R2, the cathode of the diode D4 being connected to the cathode of the diode D2. The collector of the transistor T1 is connected to the operating coil of the relay RL1 and the emitter of said transistor is connected to the output 31. The collector and base of the transistor T1 are also connected to the output 31, the collector being connected through a zener diode Z2 and the base through a resistor R3.

The other end of the operating coil of the relay RL2 is connected to the relay RL2 through a zener diode Z1, but is also connected to the collector of an NPN-type transistor T2, the emitter of which is connected to the output 31. An output of an IC-circuit IC1 in the form of a decade scaler counter//divider, e.g. of the type CD4017 (RCA) or MC14017 (Motorola) is connected to the base of the transistor T2 through a diode D5 and a resistor R9, the cathode on the diode D5 also being connected to the cathode on the diode D3.

Connected to the input 86 is a resistor R12, which is connected to the output 31 through a parallel coupling of a capacitor C3 and a zener diode Z3 and also through a capacitor C2 and a resistor R10. The resistor R12 is also connected to two inputs on IC1. Connected between the capacitor C2 and the resistor R10 is a resistor R7 which is also connected to an input on IC1. Furthermore, the outputs S and 31 are joined through a resistor R11 and a capacitor C1, between which there is connected a connection to IC1. Finally, an output on IC1 is connected to the output 31 through a connection 23.

In order to facilitate an understanding of how the control device 7 functions, the manner in which the main-beam circuit of FIG. 1 functions will be described first, with reference to FIG. 5. The ignition switch 5, the light dimmer switch 10, the vehicle light selector switch 6, the full beam and the dipped beam are each shown in FIG. 5 in each of two states 0 and 1, where 0 and 1 indicate respectively the open and closed position of the ignition switch, the light dimmer switch and the light selector switch and the extinguished and illuminated state of the main beam and dipped beam respectively.

In a first position I all components in FIG. 5 are in the state 0, i.c. the ignition is switched off, the light selector switch is set to the lights-off position, the light dimmer switch is inactivated and the main lights are switched off or extinguished. By activating the dimmer switch it is possible to attain position II, in which the headlights remain on main beam, for as long as the dimmer switch is activated.

Subsequent to switching on the ignition and setting the light switch 6 to the main-lights position, dipped lights are obtained in position III, it being possible to extinguish these lights by means of the light switch, position IV. The lights are extinguished when the ignition is switched off and the light switch is in the main-lights position, position V. When the ignition is subsequently switched on, position VI, the headlights are on dipped beam, which can be changed to main beam, position VII, and then back to dipped beam again, position VIII, by means of the dimmer switch. Subsequent to switching off the lights, position IX, the headlights are switched to dipped beam when the dimmer switch is again activated, it being possible to change to main beam by activating the dimmer switch, position X. If the ignition is now switched off, position XI, the lights will be turned off. When the ignition is again switched on, position XII, the headlights will be on dip instead of on main beam.

Thus, the control device 7 is such that when the ignition is switched on, the headlights will always be on dipped beam, or half-beam, when the light switch is on, or is moved to the main lights position, irrespective of whether the lights were on main beam or dipped beam when the ignition was turned off.

Referring to FIGS. 1 and 4, the input 30 of the control device 7 is always connected to the voltage source 4. When the main lights are to be used, the input 86 is also connected to the voltage source 4. This causes the transistor T1 to open so as to energize the relay RL1, whereupon the voltage source 4 is connected to the input 20 of the relay RL2, which is then used to switch between main beam and dipped beam, i.e. to switch between the working contact 22 and the rest contact 21. The relay RL2 cannot be energized while the transistor T2 blocks the output 31, and consequently the headlights are switched to dipped beam. Activation of the dimmer switch 10 connects the output S with the chassis, which results in the transistor T2 opening so that the relay RL2 is activated and the headlights switched to main beam. Renewed activation of the dimmer switch 10 again changes the state of T2, so that the relay TL2 is de-energized and the headlights are switched to dipped beam.

When switching off the ignition, the connection between the input 86 and the voltage source 4 is broken, whereupon both relays are de-energized and the lights extinguished. The same effect is obtained when activating the light selector switch 6 with the ignition on.

In the absence of voltage on the input 86, it is possible, by activating the dimmer switch 10, i.e. by connecting the output S with the chassis, to hold both relays RL1 and RL2 energized for as long as the dimmer switch is activated, whereby the "flashing warning function" of the main beam is initiated. As soon as voltage is applied thereafter to the input 86, the headlights are again switched to a dimmed beam, since only the relay RL1 is activated.

One important feature of the invention is found in the provision of a safety switch which despite any malfunction in the electronics or relay coils of the control device 7 will nevertheless enable the headlights to work. For instance, should the relay RL1 cease to function, the rest contact 17 of the relay can be connected to the voltage source through the light switch 6. This will provide at least dipped headlights, even though the power may be reduced. The extent to which power is reduced will depend on the dimensioning of the cables which connect the light switch 6 with the ignition switch 5 and control device 7 respectively, and naturally also on the construction and dimensioning of the light switch 6.

The two zener diodes Z1 and Z2 protect respective transistors T2 and T1 against an overvoltage, and in the case of a conventional 12 volt system may have an operating voltage in the order of about 22 V. The zener diode will conveniently have an operating voltage of about 5 V.

As will be understood, the described control device 7 can be modified in various ways, both electrically and mechanically, without changing its function. Because the control device includes solely two simple mechanical components, namely the two relays, it can be made very reliable in operation and is also easy to manufacture.

In the case of the illustrated embodiment, the vehicle ignition switch 5 is included in the main-light circuit. It will be understood, however, that the light selector switch 6 may be connected directly to the voltage source 4 while keeping the general function unchanged.

Furthermore, although the negative terminal has been connected to the vehicle chassis in the case of the illustrated embodiment, it will be appreciated that the reverse is also conceivable.

We claim:

1. A control device for controlling a main-light circuit of a motor vehicle, including a main-beam system and a dipped beam system, the control device including:
   (a) inputs connectable to one terminal of a voltage source and one of which is intended to be connected to said one terminal via a vehicle light selector switch;
   (b) first outputs intended for connection to a headlight of the vehicle and of which outputs at least one is intended for connection to the dipped-beam system and at least one is intended for connection to the main-beam system;
   (c) second outputs connectable to another terminal of the voltage source via the vehicle chassis and of which outputs one is intended to be connected to said another terminal via a light dimmer switch intended for switching dipped and main beams; and
   (d) first and second monostable beam-changing relays respectively connected to said inputs and said first outputs, said relays being connected to an electronic control unit which activates the relays as a function of whether the input which is connectable to the light selector switch and the second output which is connectable to the dimmer switch are connected to the voltage source or not; and
   wherein a rest contact of said first relay is connected to the control device input intended for connection to the light selector switch, and an input of said first relay is connected to an input of said second relay having a rest contact connected to the dipped beam output, whereby when no relays can be activated there is provided a current path for supplying current to the dipped beam facility.

2. A control device according to claim 1, wherein:
   an active contact of the first relay is connected to the control device input intended for direct connection to the voltage source; and
   the first relay is actuable with the aid of the control unit in the normal operation of the control device.

3. A control device according to claim 1 wherein:
   one terminal is positive and the other negative; and
   the control unit is connected to both of the control device inputs intended for connection to the positive terminal of the voltage source.

4. A control device according to claim 2, wherein an operating coil of the first relay has connected thereto a transistor for regulating the current through said coil, the transistor base being connected to the input intended for connection to the light selector switch.

5. A control device according to claim 2, wherein the control device includes an integrated circuit; and an operating coil of the second relay has connected thereto a transistor for regulating the current through said coil, the transistor base being connected to an output of the integrated circuit.

6. A control device according to claim 1, wherein an active contact of said second relay is connected to the main-beam output.

7. A control device according to claim 1, wherein the control device is constructed to switch the headlight to dipped beam each time the input capable of being connected to the light selector switch is connected to the voltage source.

8. A control device according to claim 1, further including an outer protective cover.

9. A control device according to claim 8, wherein the inputs and said first and second outputs have the form of flat pins which protrude through a base plate of the protective cover for simple connection of the control device.

10. A control device according to claim 2 wherein:
    one terminal is positive and the other negative; and
    the control unit is connected to both of the control device inputs intended for connection to the positive terminal of the voltage source.

11. A control device according to claim 10, wherein an operating coil of the first relay has connected thereto a transistor for regulating the current through said coil, the transistor base being connected to the input intended for connection to the light selector switch.

12. A control device according to claim 10 wherein the control device includes an integrated circuit; and an operating coil of the second relay has connected thereto a transistor for regulating the current through said coil, the transistor base being connected to an output of the integrated circuit.

13. A control device according to claim 2, wherein an active contact of said second relay is connected to the mainbeam output.

* * * * *

UNITED STATES PATENT AND TRADEMARK OFFICE
CERTIFICATE OF CORRECTION

PATENT NO. : 4,870,296

DATED : September 26, 1989

INVENTOR(S) : Krister Nordeborn et al.

It is certified that error appears in the above-identified patent and that said Letters Patent is hereby corrected as shown below:

Fig. 1 of the drawings should be added as shown on the attached sheet.

Signed and Sealed this

Twenty-first Day of August, 1990

Attest:

HARRY F. MANBECK, JR.

*Attesting Officer*   *Commissioner of Patents and Trademarks*